Nov. 3, 1964 D. J. ROTIER 3,155,824

CONTROL APPARATUS

Filed March 22, 1961 2 Sheets-Sheet 1

*INVENTOR.*

DONALD J. ROTIER

BY Roger W. Jensen

ATTORNEY

Nov. 3, 1964 D. J. ROTIER 3,155,824

CONTROL APPARATUS

Filed March 22, 1961 2 Sheets-Sheet 2

INVENTOR.
DONALD J. ROTIER
BY Roger W. Jensen
ATTORNEY

United States Patent Office 3,155,824 Patented Nov. 3, 1964

3,155,824
CONTROL APPARATUS
Donald J. Rotier, Crystal, Minn., assignor to Honeywell Inc., a corporation of Delaware
Filed Mar. 22, 1961, Ser. No. 97,488
12 Claims. (Cl. 235—189)

The present invention relates to the problem of resolving polar coordinates into rectangular coordinates in a completely electronic and compact method to give a highly reliable unit in a small package. One of the variations of accomplishing this end result is to phase modulate and amplitude modulate a square wave signal with the angle $\theta$ and the magnitude $\rho$. This phase modulated and amplitude modulated signal is then passed through a bandpass filter to give a sine wave and applied to the inputs of two demodulators. The reference signals for the demodulators are square waves which are ninety degrees out of phase to produce output signals from the demodulators which are indicative of the X axis as $\rho \cos \theta$ and the Y axis as $\rho \sin \theta$.

One variation of this idea is using two high amplitude sine waves, ninety degrees apart in phase, for the reference frequencies applied to the demodulators. Another variation would be to amplitude modulate one signal and shape this into a sine wave and apply this to the two demodulators as the input signal and then phase modulate the first signal. The phase modulated signal would then be applied to one demodulator and also phase shifted ninety degrees and applied to the other demodulator. Further study would reveal other variations of accomplishing the end results using the teachings in this invention.

One of the objects of this invention is to produce a completely electronic, compact, and very reliable coordinate resolving system.

Another object of this invention is to provide a better form of a phase modulated and amplitude modulated multiplier.

Other objects of this invention will become apparent from a reading of the following specification and appended claims, and in conjunction with the accompanying drawings of which:

Figure 1:
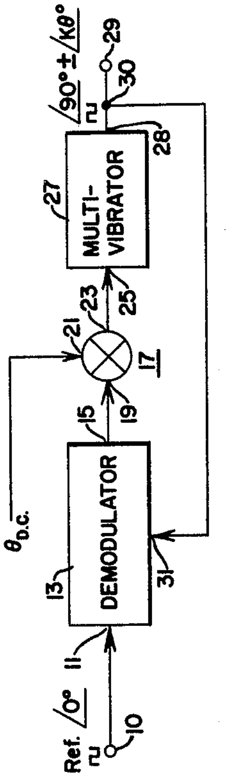
FIGURE 1 is a block circuit diagram showing a variable phase shifting device or a device for phase modulating an input signal.

In FIGURE 1 a demodulator 13 is shown which is adapted to receive a square wave signal at an input 11 from an input terminal means 10. An output 15 of the demodulator 13 is connected to an input 19 of a summing means 17. The summing means 17 is also adapted to receive a signal $\theta$ at another input 21 thereof. An output 23 of the summing means 17 is connected to an input 25 of a multivibrator 27. An output 28 of the multivibrator 27 is connected to an output terminal means 29 and also to a junction point 30. The junction point 30 is connected to an input 31 of the demodulator 13.

Figure 2:
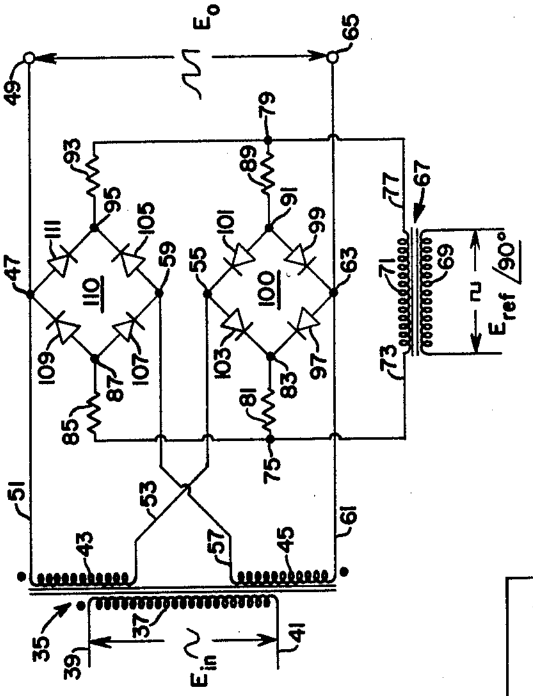
FIGURE 2 is a circuit diagram of a device which can be used as a modulator or a demodulator depending upon whether the input signal is applied to the left hand or right hand terminals.

In FIGURE 2 a first transformer 35 is shown with a primary winding 37 with connection leads 39 and 41. Transformer 35 also includes a pair of secondary windings 43 and 45. One end of secondary winding 43 is connected to a junction point 47 and to an output terminal 49 by a lead 51. The other end of secondary winding 43 is connected to a junction point 55 by a lead 53. One end of secondary winding 45 is connected to a junction point 59 by a lead 57. The other end of secondary winding 45 is connected by a lead 61 to a junction point 63 and an output terminal 65. The leads 39, 51, and 61 are selected such that the polarity of all the leads is the same at a given instant. A reference transformer 67 is shown with a primary winding 69 and a secondary winding 71. One end of the secondary winding 71 is connected by a lead 73 to a junction point 75. The other end of secondary winding 71 is connected by a lead 77 to another junction point 79. A resistor 81 is connected between a junction point 83 and the junction point 75, and another resistor 85 is connected between a junction point 87 and the junction point 75. A third resistor 89 is connected between a junction point 91 and junction point 79. A fourth resistor 93 is connected between a junction point 95 and the junction point 79. A diode 97 is shown connected between junction points 63 and 83. A second diode 99 is shown connected between junction points 63 and 91. A third diode 101 is shown connected between the junction points 55 and 91. A fourth diode 103 is connected between junction points 55 and 83. The four diodes 97, 99, 101, and 103, which can be referred to as bridge 100, are arranged to permit current flow from junction point 91 to junction point 83. As also can be seen a diode 105 is connected bvetween junction points 59 and 95, a diode 107 is connected between junction points 59 and 87, a diode 109 is connected between junction points 47 and 87, and a diode 111 is connected between junction points 47 and 95. This diode bridge, which is generally designated as 110, is arranged for current flow from junction points 87 to junction point 95.

Figure 3:
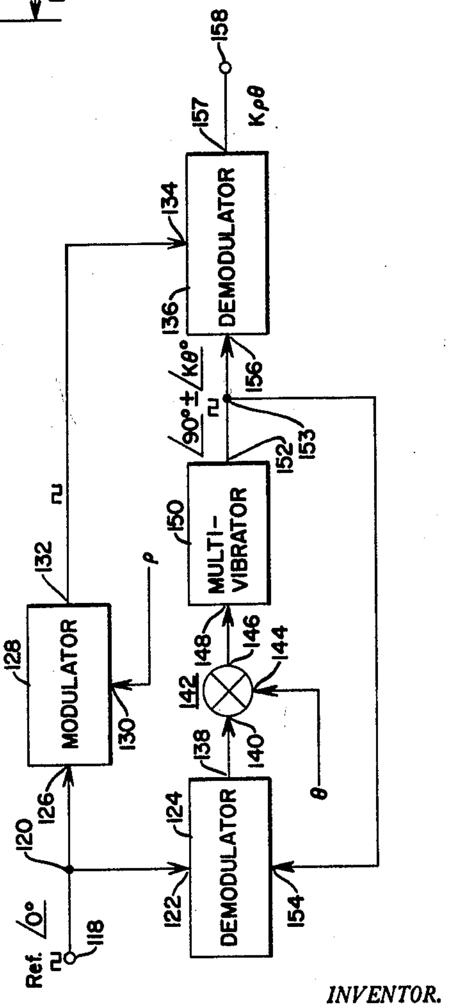
FIGURE 3 is a block circuit diagram showing a method of amplitude modulating and phase modulating a reference signal by two control signals to form a multiplier which is used as a basic part of this invention.

In FIGURE 3 an input terminal means 118 is shown connected to a junction point 120 and from there to an input 122 of a demodulator or signal converting means 124. The junction point 120 is also connected to an input 126 of a modulator or signal converting means 128. The terminal means 118 serves as a point to which an input reference signal is applied. The modulator 128 is adapted to receive a signal $\rho$ at an input 130 thereof. An output 132 of modulator 128 is connected to an input 134 of a demodulator or signal converting means 136. An output 138 of the demodulator 124 is connected to an input 140 of a summing means 142. The summing means 142 is also adapted to receive an input signal $\theta$ at another input 144 thereof. An output 146 of the summing means 142 is connected to an input 148 of a multivibrator or inverter means 150. An output 152 of the multivibrator 150 is connected to a junction point 153 and from there to an input 154 of the demodulator 124. The junction point 153 is also connected to an input 156 of the demodulator 136. An output 157 of the demodulator 136 is connected to an output terminal means 158. The modulator 128 and the demodulators 124 and 136 are the same general type as shown in FIGURE 2. The multivibrator 150 can be of the type shown on page 630 of Radio and Electronic Engineering, fourth edition, by Terman. The multivibrator 27 in FIGURE 1 can also be of the type shown in the book by Terman. The summing means 142 can be just a pair of summing resistors applied to the input 148 of the multivibrator 150.

Figure 4:
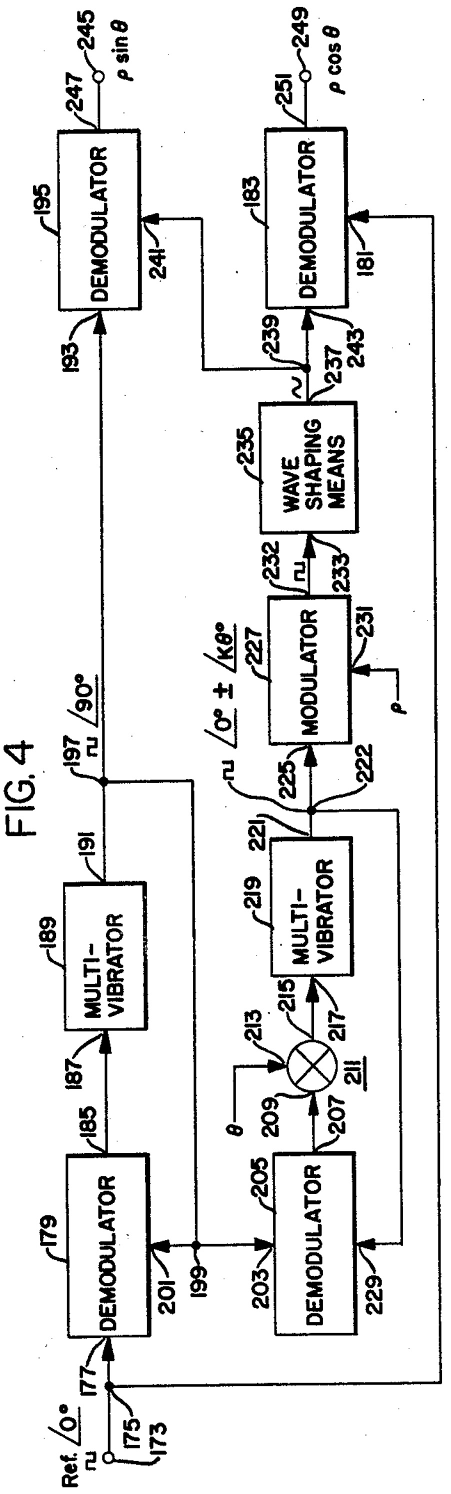
FIGURE 4 is a block circuit diagram showing one embodiment of the invention where the signal is phase and amplitude modulated and shaped into a sine wave and applied to two demodulators.

In FIGURE 4 an input terminal means 173 is shown connected to a junction point 175 and from there to an input 177 of a demodulator or signal converting means 179 and also to an input 181 of a demodulator or signal converting means 183. An output 185 of the demodulator 179 is connected to an input 187 of a multivibrator or inverter means 189. An output 191 of the multivibrator 189 is connected to an input 193 of a demodulator 195. A junction point 197 at the output 191 of the multivibrator 189 is connected to another junction point 199 and from the junction point 199 to another input 201 of the demodulator 179. The junction point 199 is also connected to an input 203 of a demodulator or signal converting means 205. An output 207 of the demodulator 205 is connected to an input 209 of a summing means 211. The summing means 211 has another input 213 adapted to receive a control signal $\theta$. An output 215 of the summing means 211 is connected to an input 217 of a multivibrator or inverter means 219. An output 221 of the multivibrator 219 is connected to a junction point 222 and from the junction point 222 to an input 225 of a signal converting means or modulating means 227. The junction point 222 is also connected to another input 229 of the demodulator 205. The modulator 227 is adapted to receive a control signal $\rho$ through another input 231. An output 232 of the modulator 227 is connected to an input 233 of a wave shaping means or filter means 235. The wave shaping means 235 can be a simple bandpass filter to obtain a sine wave output signal with the same frequency as the input reference square wave signal. An output 237 of the wave shaping means 235 is connected to a junction point 239 and from the junction point 239 to an input 241 of the demodulator 195. The junction point 239 is also connected to another input 243 of the demodulator 183. An output terminal means 245 is connected to an output 247 of the demodulator 195. Another output terminal means 249 is connected to an output 251 of the demodulator 183.

Figure 5:
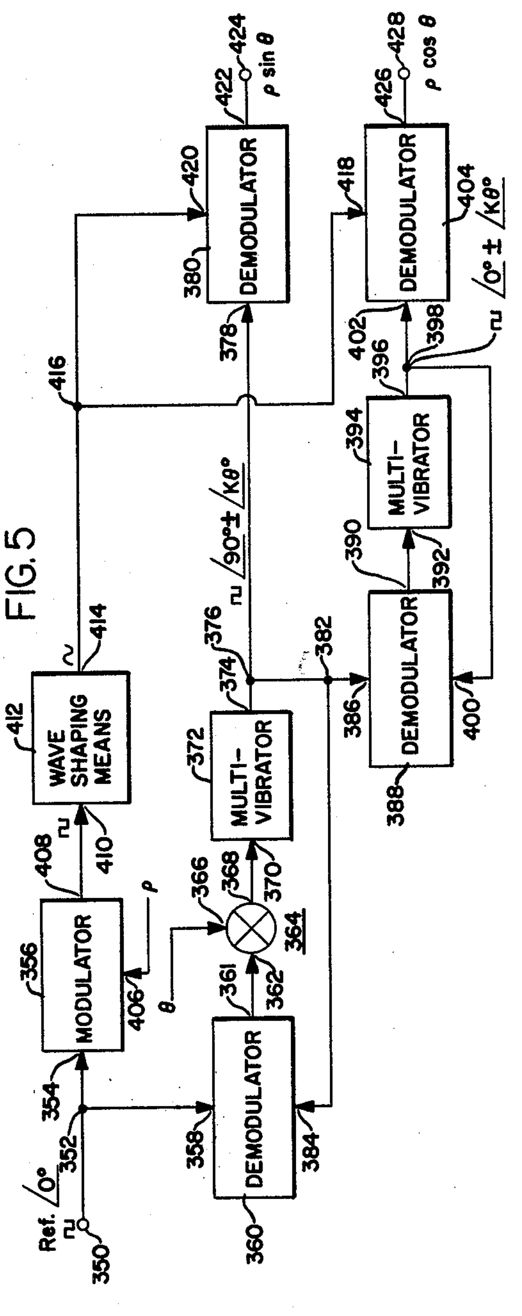
FIGURE 5 is another embodiment of the invention where a reference signal is amplitude modulated and applied to two separate demodulators and the reference signal is also phase modulated and the phase modulated signal is separated into two separate phase modulated signals ninety degrees apart and applied to the same two demodulators.

In FIGURE 5 a square wave input signal is applied to an input terminal means 350 at a zero degree reference point. The input terminal means 350 is connected to a junction point 352 and from there to an input 354 of a signal converting means or modulating means 356. The junction point 352 is also connected to an input 358 of a demodulator or signal converting means 360. An outlet 361 of the demodulator 360 is connected to an input 362 of a summing means 364. The summing means 364 is also adapted to receive an input signal $\theta$ at another input 366. An output 368 of the summing means 364 is connected to an input 370 of a multivibrator or inverter means 372. Multivibrator 372 is of the same general type as shown in FIGURE 3 as multivibrator 150. An output 374 of the multivibrator 372 is connected to a junction point 376 and from there to an input 378 of a demodulator or signal converting means 380. The junction point 376 is also connected to a junction point 382 and from there to another input 384 of the demodulator 360. The junction point 382 is also connected to an input 386 of a demodulator or signal converting means 388. The signal appearing at the junction point 376 is a square wave which is ninety degrees out of phase with the input signal at terminal 350 plus or minus an angle of a constant K times the input signal $\theta$ applied at input terminal 366 in degrees or this can be expressed as $\angle 90° \pm \angle K\theta°$. An output 390 of the demodulator 388 is connected to an input 392 of a multivibrator or inverter means 394. Multivibrator 394 is of a type similar to multivibrator 372. An output 396 of the multivibrator 394 is connected to a junction point 398 and from there to another input 400 of the demodulator 388. The junction point 398 is also connected to an input 402 of a demodulator or signal converting means 404. The modulator 356 is adapted to receive an input signal $\rho$ at another input 406. An output 408 of the modulator 356 is connected to an input 410 of a wave shaping means or filter means 412. The wave shaping means 412 has the characteristics of a band pass filter and from a square wave input signal produces a sine wave output signal. An output 414 of the wave shaping means 412 is connected to a junction point 416 and from there to another input 418 of the demodulator 404. The junction point 416 is also connected to another input 420 of the demodulator 380. An output 422 of the demodulator 380 is connected to an output terminal means 424. The signal appearing at output terminal means 424 is representative of the Y axis component $\rho \sin \theta$ in cartesian coordinates of the input polar coordinate signals. An output 426 of the demodulator 404 is connected to an output terminal means 428. A signal representative of $\rho \cos \theta$ appears at the output terminal means 428 when the system is energized and the input signals are applied. All the modulators and demodulators used in FIGURE 5 can be of the type shown in FIGURE 2.

All of the modulators and demodulators shown as blocks in this application can be of the same general type as shown in FIGURE 2 of the drawings but they are not limited to this type and can be of any other type suitable to perform the invention. The multivibrators shown in the five figures of this invention are also of the same type as shown in FIGURE 3 by block 150. Again, this does not mean that the multivibrators are limited to that type but they must be of a type which is variable in frequency as a function of a signal applied thereto. The summing means shown in the various figures can be two summing resistors or any other type of means for summing signals such as transformers and the like. The summing means could be part of the multivibrator or it could be a completely separate means for summing the input signals.

No power supply terminals are shown in the drawings and the modulators and demodulators do not need any power other than the reference signals which are applied to them. Multivibrators in all the circuits, however, do need energization power of some type. The wave shaping means can be band pass filters and as such would not require energization in most instances.

*Operation*

The operation of FIGURE 2 will be explained first. This circuit may be used in the demodulator blocks shown in the remaining figures and also the modulator blocks. The reference voltage applied to primary 69 can be any voltage that goes through the zero point at the required times. The purpose of the signal applied to primary 69 of the transformer 67 is simply to produce a switch action and switch the demodulator from one state to the other on the change of the input signal from positive to negative. As will be realized after a further description, the faster the switching time on the signal applied to primary 69, the greater the accuracy of this circuit will be. The wave shape appears at output terminals 49 and 65 is dependent upon the wave shape of the signal applied to the primary 37 of the transformer 35. If a sine wave signal is applied to primary 37 as shown, the output signal would appear as shown by $E_0$ when the input and reference signals are 90° apart. If the input signal and the reference signal were zero degrees apart in phase reference to each other, the output signal would appear as a full wave rectified sine wave. In the first case, the output had a zero D.C. component and in the second case it was all D.C. component. Now if the signal applied to primary 37 is a square wave, the output would also be a square wave. This wave form would be a nonsymmetrical square wave at any time when the input and reference phases were at a phase angle of something other than 90°. When the input and reference signals are exactly zero degrees with reference to each other, the output signal will theoretically be a constant D.C. voltage although in actual practice, the output will be interrupted for a finite period of time while the switching action is taking place. It can easily be seen, that the output signal will be a linear function of the phase difference of the input and reference signal when square waves are applied to both primaries. That is, the effective D.C. value of the output changes linearly with the phase difference applied to the two primaries. When a sine wave is applied to winding 37, the output signal is of an alternating nature having an effective D.C. value, the magnitude of which varies as a sinusoidal function of the difference in phase between the signals applied to the two primaries 37 and 69 as long as the amplitude of $E_{in}$ is constant. That is, the output will vary at a different rate around a phase difference of 90° than it will around a phase difference of 10° due to the wave shape of the output signal and the characteristics of a sine function. The signal $E_{out}$ is also indicative of the amplitude of the signal $E_{in}$ in both cases of sine waves or square waves being applied to the primary winding 37.

If it is arbitrarily assumed that the input signal and the reference signal are in phase, the voltages at a given instant on terminals 51, 61 and 73 would be positive all at the same time. A positive voltage upon 73 would meet resistance from diodes 97 and 103 of bridge 100 to conduction in that direction however the diodes 109 and 111 and the diodes 107 and 105 of bridge 110 would allow current flow from terminal 73 through resistors 85 and 93 back to terminal 77. Since the diodes 105, 107, 109, and 111 are in full conduction at this time the junction point 59 is effectively the same voltage as junction point 47 and there is almost a complete short between these two points. This would allow secondary winding 45 to be connected across the output terminals 49 and 65. The secondary winding 43 would not be connected across the output terminals 49 and 65 because the diodes 101 and 97 would not allow conduction between junction points 55 and 63 to effectively place the junction point 55 in connection with junction point 63. With this effective connection the terminal point 49 would be at a negative voltage with respect to the terminal point 65. As soon as the input voltage switched so that terminals 51 and 61 and 73 would be at a negative potential, the four diodes constituting the bridge 110 would stop conducting and the diodes constituting bridge 100 would start conducting. The conducting path is from positive terminal 77 of secondary 71 through resistor 89, the diodes in bridge 100, and resistor 81 back to the negative terminal 73 of the secondary winding 71. The conduction of the diodes in bridge 100 would place the junction point 55 at essentially the same potential as junction point 63 and again place the terminal 65 at a positive potential with respect to terminal 49 since the secondary winding 43 is effectively connected across the output terminals 49 and 65. It is thus seen that in theory although not shown in FIGURE 2, that the output will be a constant D.C. potential of the same amplitude as the amplitude of the alternating voltage input square wave is with respect to zero. In actual practice the output voltage will be interrupted for a very minute interval of time while the switching action takes place.

If the input voltage applied to primary winding 37 were assumed to stay constant in amplitude, the output voltage would be a function of the phase difference between the reference voltage and the input voltage. As the difference in phase between the input voltage and the reference voltage increased, the output voltage would become an unsymmetrical alternating voltage wave form and continue towards a symmetrical wave form until the input voltage and the reference voltage were exactly ninety degrees out of phase. At this ninety degree point the output wave form would be a symmetrical square wave output and would produce no D.C. voltage component at the output. It can be seen that if the original conditions are that the reference voltage and the input voltage are ninety degrees out of phase the output voltage will reflect both the amplitude of the input voltage and any phase shift from the original conditions.

It can be seen that if a D.C. voltage is applied to terminals 49 and 65 and a reference voltage is applied to the primary winding 69 the input D.C. voltage will be switched back and forth from secondary winding 43 to secondary winding 45 to produce an output signal which has the same frequency and is in phase with the reference voltage and is of an amplitude directly proportional to the D.C. voltage applied to terminals 49 and 65. If the D.C. voltage applied to these terminals 49 and 65 is changed in polarity, the output voltage will change in phase one hundred eighty degrees. Thus, in this mode of operation, the circuit of FIGURE 2 functions as a modulator.

In summation, the circuit of FIGURE 2 can be used to provide an output which is a trigonometric function of the input voltage when a sine wave is applied to the input or it can be used to provide a D.C. output signal which is directly proportional to the amplitude of the input signal and the phase difference between the input and the reference signal when the input signal is a square wave. It can also be used as a modulator when the input signal is a D.C. signal applied to terminals 49 and 65.

In FIGURE 1 a block circuit diagram is shown of a device which may be termed in various manners such as a phase modulating means or as a variable phase shift means. In this connection, an alternating input signal, applied to the input 11 of demodulator 13, is shifted in phase according to an input signal $\theta$ applied to terminal 21 of the summing means 17 and appears at the output terminal means 29 shifted in phase according to the input signal $\theta$. For convenience it may arbitrarily be assumed that the input signal $\theta$ is zero and that the signal applied to input 11 is a square wave of an amplitude exactly equal to the amplitude of the output signal of the multivibrator 27. As was mentioned in connection with FIGURE 2 the demodulator 13 will have an output voltage of zero volts if the voltages applied to inputs 11 and 31 are exactly ninety degrees out of phase. With the voltages applied to inputs 11 and 31 ninety degrees out of phase and the output voltage at output 15 indicative of zero volts, the summing means 17 will have an output of zero volts and no voltage will be applied to the input of the multivibrator 27. With no voltage applied to multivibrator 27 there will be no reason for it to change in frequency from the frequency at which it is presently running. If something happens to alter the frequency of the multivibrator, its output voltage will begin to change in phase from the voltage applied to input 11. With this difference in phase, an output voltage will appear at output 15 of the demodulator 13. This output signal is summed in summing means 17 along with a $\theta$ signal of zero volts and applied to multivibrator 27 at the input 25 to reduce the frequency of the multivibrator 27 and bring it back in step with the frequency of the voltage applied at input 11 of the demodulator 13. If the frequency of the multivibrator 27 decreases, the voltage applied at its input will increase the frequency so that the multivibrator in effect is locked in frequency with the voltage applied to the input 11 of the demodulator 13. Since, for the demodulator 13 to have an output voltage of zero, the voltages applied to 11 and 31 must be ninety degrees out of phase, it can be seen that the phase of the voltage at output terminal means 29 must be ninety degrees out of phase with the input voltage applied to input 11.

Now if a voltage is applied to the input 21 of the summing means 17 a voltage summation with that appearing at 19 is applied to the input 25 of the multivibrator 27. The multivibrator 27 will increase or decrease in frequency depending upon the polarity of the voltage applied at input 21 and change frequency long enough for the output signal to change in phase to produce an output from the demodulator which is a D.C. voltage equal and opposite to the voltage applied to the input 21 by the signal $\theta$. When the signals are applied to inputs 19 and 21 are equal and opposite in polarity, there will be a resultant voltage of zero applied to the multivibrator 27 and the output signal at output terminal means 29 will remain at a constant phase shift from the input voltage at terminal 11 until another change takes place in the magnitude or polarity of the voltage $\theta$. It can thus be seen that the output voltage at output terminal means 29 can be shifted in phase proportional to the D.C. voltage applied at input terminal 21. If the voltage $\theta$ were a slowly varying D.C. voltage the output voltage would be modulated or varied in phase from the input voltage and would thus be called a phase modulating configuration. Another possible way of describing the output signal would be to state that it is the input A.C. signal at an angle of ninety degrees plus or minus a constant K times the input $\theta$ in degrees.

FIGURE 3 shows the basic phase modulated, amplitude modulated multiplier which is one variation of the multipliers used in two of the variations of this invention. As will be noticed, the demodulator 124, the summing means 142, and the multivibrator 150 form a combination similar to that shown in FIGURE 1 and would be used to phase modulate the reference signal according to an input signal $\theta$. This would be one signal into the demodulator 136 and may also be referred to as a multiplicand signal. The modulator 128 which would be similar to that shown in FIGURE 2 with the input signal $\rho$ applied to terminals 49 and 65 and the reference signal applied to the primary winding 69 of transformer 67 would give an amplitude modulated output signal and this signal would be applied to the input 134 of the demodulator 136. The signal $\rho$ could also be referred to as a multiplier signal. As was stated before, the demodulator 136 will give an output signal which is dependent both upon the phase relation between the two input signals and the amplitude of the input signal which is applied to the primary winding 37 of the transformer 35. The output signal at output terminal means 158 would then be a constant K times $\rho$ times $\theta$ or $K\rho\theta$. This multiplier would be what is termed a four quadrant multiplier in that if only one of the inputs, either $\rho$ or $\theta$, is negative, the output signal will be a negative voltage. If both $\rho$ and $\theta$ are negative, the output voltage will be positive. This is accomplished since a negative $\rho$ will give an output signal which is one hundred eighty degrees out of phase with the signal obtained when $\rho$ is positive. Whether $\theta$ is negative or positive determines on which side of the angle ninety degrees the output of multivibrator 152 is phase shifted. If either $\rho$ or $\theta$ is indicative of zero, the demodulator will give no output since no output can be obtained if there is no input voltage on winding 37 and there can be no switching action if there is no input voltage at primary winding 69.

The multiplier in FIGURE 3 could also be constructed in a slightly different manner by placing the amplitude modulator 128 in between the output of the multivibrator 150 and the input 156 of the demodulator 136. In this case, the input applied to 134 of the demodulator 136 would be of constant amplitude and the signal applied to input 156 would be both phase modulated and amplitude modulated and the result at the output terminal means 158 would still be the same.

In FIGURE 4 a square wave signal at zero degrees reference is shown being applied to input terminal means 173. This reference signal is applied to the demodulator 179 and to the multivibrator 189 so that the output of the multivibrator 189 is a signal which is of a constant amplitude and is ninety degrees out of phase with the input to the demodulator 179. As can be seen, the combination of the demodulator 179 and the multivibrator 189 is the same as FIGURE 2 if the summing means 17 would have been left out of FIGURE 1. This demodulator and multivibrator combination constitutes a ninety degree phase shifting mechanism which keeps the signals to the demodulators 195 and 183 exactly ninety degrees apart to provide for the high accuracy obtainable in this invention. The output of the multivibrator 189 is applied to the phase modulating portion of this circuit comprised of the demodulator 205, the summing means 211 and the multivibrator 219. The signal appearing at the junction point 222 is then amplitude modulated as mentioned in connection with another variation of FIGURE 3. The output of the modulator 227 is then applied to the wave shaping means 235 and converted to a sine wave which appears at the junction point 239. The sine wave appearing at junction point 239 is representative of the phase and amplitude of the square wave appearing at the output 232 of the modulator 227. The sine wave appearing at junction point 239 is applied to the inputs 243 and 241 of the demodulators 183 and 195 respectively. These inputs 241 and 243 correspond to the primary winding 37 of the transformer 35 shown in FIGURE 2. Since the inputs to the two demodulators 195 and 183 are the same and the reference signals applied to the inputs 193 and 181 are exactly ninety degrees apart in phase, the output signals will be indicative of $\rho \sin \theta$ and $\rho \cos \theta$. The quantities $\rho$ and $\theta$ are the terms ordinarily used to designate the magnitude and angle of a polar coordinate vector and thus the output of this resolver gives the X axis component and the Y axis component in rectangular or cartesian coordinates of what the vector appearing in the polar coordinates had been. It can thus be determined that if $\rho$ were a quantity equal to zero, there would be no output even though there were a large signal representing the angle $\theta$. However, an output would appear if the magnitude $\rho$ were significant and the angle $\theta$ were zero. If the circuit is traced, assuming the angle $\theta$ to be zero it would be found that the signal appearing at junction point 199 is ninety degrees out of phase with the appearing at junction point 175. After the signal appearing at junction point 199 is applied to the phase modulating circuit, an output signal appears at junction joint 222 which is ninety degrees out of phase with the signal appearing at 199 due to the fact that the angle $\theta$ was assumed to be zero. The angle of the signal appearing at junction point 222 would therefore be in phase with the signal appearing at junction point 175. This signal is then applied to modulator 227 which keeps the signal in the same phase relationship but varies the magnitude according to $\rho$. After the signal appearing at the output 232 of the modulator 227 is passed through the wave shaping means 235 it appears as a sine wave at junction point 239. This signal appearing at junction 239 would be of the same phase relationship as the input signal at input 181 of the demodulator 183. As has been explained before, maximum output for a given amplitude signal is obtained from the demodulator when the input and reference signal are in phase and thus the output at terminal means 249 would be $\rho \cos \theta$ which would be equal to $\rho$ only, since the cosine of zero degrees is one. The signal appearing at junction point 239 is applied to the input 241 of the demodulator 195. However, the signal appearing at the input 241 is ninety degrees out of phase with the voltage appearing at the reference terminal 193. As has been explained before, the output of the demodulator is zero voltage when the reference in the input signals are ninety degrees out of phase and thus, although a signal $\rho$ is applied of a significant value, there is no output since the sine of zero degrees is also zero. If a signal $\theta$ representing ninety degrees is applied to the summing means 211, the output of the multivibrator 219 will be a signal ninety degrees in addition to the basic output phase and would thus be of the same phase as the signal appearing at junction point 197. In this case, the signals appearing at inputs 241 and 193 of the demodulator 195 would be exactly in phase and the output would be $\rho \sin \theta$. Since sine of ninety degrees is one, the output would be representative of the magnitude of $\rho$. By the same reasoning, the signals applied to the inputs 243 and 181 of the demodulator 183 would be ninety degrees out of phase and the output appearing at terminal means 249 would be $\rho$ cos $\theta$ or zero since cosine of ninety degrees is zero.

In FIGURE 5 a square wave input signal is shown applied to terminal 350 at a reference phase of zero degrees. This signal is amplitude modulated in the modulator 356 and shaped into a sine wave through the use of wave shaping means or filter 412 and applied to inputs 420 and 418 of the demodulators 380 and 404 respectively. The inputs 420 and 418 would correspond to the input shown as the primary winding 37 of transformer 35 in FIGURE 2. The signal applied to terminal point 350 is also applied to the phase modulating means comprising the demodulator 360, the summing means 364, and the multivibrator 372. The signal appearing at the junction point 376 is a square wave which is ninety degrees out of phase from the signal appearing at junction point 352 plus or minus an angle which is a constant K times the input $\theta$. The signal appearing at junction point 376 is applied to an input 378 of the demodulator 380 to perform the switching action of the demodulator. Since basically the two signals would be ninety degrees apart if no signal representing the angle $\theta$ were applied, the output of the demodulator 380 would appear as $\rho$ sin $\theta$ according to the explanation given for FIGURE 4. The signal appearing at 376 is phase shifted ninety degrees through the combination of the demodulator 388 and the multivibrator 394 to provide a signal at junction point 398 which is zero degrees in phase with respect to the signal applied to 350 plus or minus an angle equaling a constant K times $\theta$. The signal appearing at junction point 398 is applied to the input 402 of the demodulator 404 and an output is obtained at output terminal means 428 which is representative of $\rho$ cos $\theta$. The signal appearing at input 402 of the demodulator 404 will switch this demodulator either ninety degrees before or ninety degrees after the demodulator 380 is switched, the time sequence depends upon the method of connection. The fact that the two demodulators are switched ninety degrees apart and both have a sine wave input will give trigonometric functions as outputs and the signals $\rho$ sin $\theta$ and $\rho$ cos $\theta$ are obtainable in much the same manner as described in FIGURE 4.

If the input 203 of the demodulator 205 in FIGURE 4 were the reference input corresponding to primary winding 69 in FIGURE 2, a high amplitude sine wave could be applied to junction joint 197 and the combination of the demodulator 179 and the multivibrator 189 could be removed if another sine wave for switching could be obtained which was ninety degrees out of phase with the signal at junction point 197 and applied to the input 181 of demodulator 183. The reason the signals applied at inputs 203, 193, and 181 should be of a high amplitude is to provide the fast switching action which would be obtainable in low amplitude signals only with a square wave. If fast switching action is not obtained, the output signal is not as accurate under all conditions of the input signals $\rho$ and $\theta$ as would otherwise be obtainable.

The same comments about using a high amplitude sine wave would apply to FIGURE 5 when the inputs 354 and 358 are the reference or switching inputs. The only criterion is that fast switching action be obtained for a high accuracy output.

While I have shown and described two embodiments of the resolver and an embodiment of a multiplier which is more accurate due to its method of phase modulation than prior art, further modifications and improvements will occur to those skilled in the art. I desire to be understood, therefore, that this invention is not limited to the particular form shown and described and I intend in the appended claims to cover all modifications which do not depart from the spirit and scope of this invention.

What I claim is:

1. In a computing system: first demodulator means including input, reference, and output terminal means; summing, frequency variable multivibrator means including input and output terminal means; means connecting said first demodulator to said multivibrator, said multivibrator providing, in this connection configuration, an output signal which varies in phase from a reference signal in accordance with a multiplicand signal being applied to one of said summing input terminal means on said multivibrator; modulator means including input, output, and reference terminal means, said modulator being adapted to provide an amplitude modulation, of a phase modulated reference signal, by a multiplier signal applied to said input terminal means; means connecting said output terminal means of said multivibrator to said input terminal means of said modulator; second demodulator means including input, reference, and output terminal means, said second demodulator being adapted to provide a D.C. output signal indicative of the amplitude of an input signal and also of the phase of said input signal with respect to a reference signal applied to said reference terminals, said reference signal being the same reference signal as applied to said first demodulator; means connecting said output terminal means of said modulator to said second demodulator; and means connecting a means for supplying first and second reference signals to said reference terminal means on said first and said second demodulators.

2. In a computing system: first signal converting means including input, output, and reference terminal means, said first signal converting means being adapted to provide an output signal indicative of a difference between signals applied to said input and reference terminal means; summing means including input terminal means for two input signals and output terminal means, one of said input terminal means being adapted to receive a multiplicand signal; means connecting said output terminal means of said first signal converting means to another of said input terminal means of said summing means; inverter means including input and output terminal means, said inverter means being adapted to give an output signal indicative in frequency of a characteristic of an input signal; means connecting said output terminal means of said summing means to said input terminal means of said inverter means; second signal converting means including input, output, and reference terminal means, said second signal converting means being adapted to provide an output signal representative of a characteristic of a multiplier signal, when said multiplier signal is applied to said input terminal means; means connecting said output terminal means of said inverter means to said input terminal means of said first signal converting means and also to said reference terminal means of said second signal converting means; third signal converting means including input, output, and reference terminal means, said third signal converting means being adapted to provide an output signal indicative of a difference between an input signal and a reference signal; means connecting said output terminal means of said second signal converting means to said input terminal means of said third signal converting means; and means connecting said reference terminal means of said first signal converting means to said reference terminal means of said third signal converting means.

3. In a multiplier system: first demodulator means including control, reference, and output means, said first demodulator being adapted to provide a D.C. output signal indicative in sense and amplitude of the phase of a control signal with respect to a reference signal; summing means including first input, second input, and output means, said summing means being adapted to combine two input signals and to give an output signal indicative of their algebraic sum; multivibrator means including input and output means, said multivibrator being adapted to vary the frequency of the output signal in accordance with variations of a D.C. input signal; means connecting said output means of said first demodulator means to said first input means of said summing means; means for applying a variable D.C. multiplicand signal to said second input means of said summing means; means connecting said output means of said summing means to said multivibrator means input means; modulator means including first input, second input, and output means, said modulator being adapted to receive a constant amplitude alternating input signal at said first input means and to apply said alternating input signal to said output means, said alternating input signal being amplitude modulated within said modulator by a variable D.C. multiplier signal applied to said second input means; means connecting said output means of said multivibrator means to said control means of said first demodulator means and also to said first input means of said modulator means; second demodulator means including input, output, and reference means, said second demodulator being adapted to provide a D.C. output signal indicative in sense and magnitude of phase and amplitude of an input alternating signal compared to a reference alternating signal; means connecting said output means of said modulator means to said input means on said second demodulator means; and means for supplying a common alternating reference signal connected to said reference means of said first and said second demodulator means.

4. In a multiplier system: first demodulator means including control, reference, and output means, said first demodulator being adapted to provide a D.C. output signal indicative in sense and amplitude of the phase of a control signal with respect to a reference signal; summing means including first input, second input, and output means, said summing means being adapted to combine two input signals and to give an output signal indicative of their algebraic sum; multivibrator means including input and output means, said multivibrator being adapted to vary the frequency of the output signal in accordance with variations of a D.C. input signal; means connecting said output means of said first demodulator means to said first input means of said summing means; means for applying a variable D.C. multiplicand signal to said second input means of said summing means; means connecting said output means of said summing means to said multivibrator means input terminal means; modulator means including first input, second input, and output means, said modulator being adapted to receive a constant amplitude alternating input signal at said first input means and to apply said alternating input signal to said output means, said alternating input signal being amplitude modulated within said modulator by a variable D.C. multiplier signal applied to said second input means; means for supplying a common alternating reference signal connected to said reference means of said first demodulator means and said first input means of said modulator means; second demodulator means including first and second input means and output means, said second demodulator being adapted to provide a D.C. output signal indicative in sense and magnitude of phase and amplitude of a first input alternating signal compared to a second input alternating signal; means connecting said output means of said multivibrator to said control means of said first demodulator and also to said first input means of said second demodulator means; and means connecting said output means of said modulator means to said second input means of said second demodulator means.

5. In a resolving system: first modulating means having a first input adapted to receive a first reference signal, a second input adapted to receive a first control signal, and an output, a second reference signal being produced at said output when said first reference signal and said first control signal are applied thereto; means for supplying a third reference signal; first and second demodulating means each including output means and input means and adapted to produce an output signal at said output means indicative in sense and magnitude of a characteristic of an input signal applied to said input means; second modulating means having a first input connected to receive one of said first or second reference signals, a second input adapted to receive a second control signal, and an output; means connecting said first demodulating means to receive another of said three reference signals at said input means of said first demodulating means; means connecting said second demodulating means to receive the remaining signal of said three reference signals at said input means of said second demodulating means; and means connecting said output of said second modulating means to said input means of said first and second demodulating means.

6. In a resolving system: first modulating means adapted to receive a first input control signal and a first reference signal, said first modulating means being adapted to provide a phase modulated output signal upon the application of input control and reference signals, said phase modulated output signal being modulated by a characteristic of said control signal and constituting a second reference signal, and said control signal being one of two polar coordinate signals to be resolved; means for suppling a third reference signal; second modulating means adapted to receive a second input control signal and connected to receive one of said first or second reference signals, said second modulating means being adapted to provide an amplitude modulated output signal upon the application of input control and reference signals, said control signal being the other of two polar coordinate signals to be resolved, and said amplitude modulated output signal being modulated by a characteristic of said other control signal and constituting a fourth reference signal; first demodulating means connected to receive said fourth reference signal and one of said two remaining reference signals as input signals, one of said reference signals being of a sinusoidal wave form, said first demodulating means being adapted to provide an output signal which will be the product of one of said control signals times the cosine of the other of said control signals upon the application of the proper input reference signals; and second demodulating means connected to receive two of said three remaining reference signals as input signals, one of said reference signals being of a sinusoidal wave form, said second demodulating means being adapted to provide an output signal which will be the product of one of said control signals times the sine of the other of said control signals upon the application of the proper input reference signals.

7. In a resolving system: phase modulating means adapted to receive a first input reference signal and a first polar coordinate input control signal to be resolved, said phase modulating means providing a phase modulated output signal upon application of said input reference and control signals, and said phase modulated output being modulated according to a characteristic of said first input control signal; amplitude modulating means adapted to receive a second polar coordinate input control signal to be resolved and connected to receive as a second input reference signal the output signal of said phase modulating means, said amplitude modulating means providing an output signal dependent upon characteristics of said input phase modulated reference signal and said second control signal upon application of said reference and control signals; first demodulating means connected to receive as one input signal said amplitude and phase modulated output signal from said amplitude modulating means and to receive as another input signal said first reference signal, said first demodulating means being adapted to produce an output signal indicative of the product of one of said control signals times the sine of the other of said control signals upon the application of said input signals to said first demodulating means, and one of said input signals being of a sinusoidal wave-shape; means for supplying a third reference signal which is approximately ninety degrees out of phase with said first reference signal; and second demodulating means connected to receive as one input signal said amplitude and phase modulated output signal from said amplitude modulating means and to receive as another input signal said third reference signal, second demodulating means being adapted to produce an output signal indicative of the product of one of said control signals times the cosine of the other of said control signals upon the application of said input signals to said second demodulating means, and one of said input signals being of a sinusoidal waveshape.

8. In a resolving system: phase modulating means adapted to receive a first input control signal and a first reference signal, said first modulating means being adapted to provide a phase modulated output signal upon the application of input control and reference signals, said phase modulated output signal being modulated by a characteristic of said control signal and constituting a second reference signal, and said control signal being one of two polar coordinate signals to be resolved; amplitude modulating means adapted to receive a second input control signal and connected to receive said first reference signal, said second modulating means being adapted to provide an amplitude modulated output signal upon the application of input control and reference signals, said control signal being the other of two polar coordinate signals to be resolved, and said amplitude modulated output signal being modulated by a characteristic of said other control signal and constituting a third reference signal; first demodulating means connected to receive said output signals from both of said amplitude and phase modulating means as input signals, one of said input signals being of a sinusoidal wave form, said first demodulating means being adapted to provide an output signal which will be the product of one of said control signals times the sine of the other of said control signals upon the application of said input reference signals; phase shifting means connected to receive said phase modulated output signal from said phase modulating means and adapted to provide an output reference signal approximately ninety degrees out of phase with a signal applied at an input of said phase shifting means; and second demodulating means connected to receive said output signals from both of said amplitude modulating and said phase shifting means as input signals, one of said reference signals being of a sinusoidal wave form, said second demodulating means being adapted to provide an output signal which will be the product of one of said control signals times the cosine of the other of said control signals upon the application of the proper input reference signals.

9. In a resolving system: first demodulating means adapted to receive first and second input reference signals, said first demodulating means providing an output signal indicative of a phase difference between said first and second input reference signals; first multivibrator means connected to receive as an input signal the output signal from said first demodulating means and adapted to provide as an output signal, a second reference signal indicative in frequency of the sense and amplitude of said input signal; second demodulating means connected to receive as a first input signal said second reference signal from said multivibrator means and adapted to receive a third reference signal as a second input signal, said second demodulating means being adapted to provide an output signal indicative in sense and magnitude of a phase difference between said second and third reference signals; means connecting said output of said first multivibrator means to said second input of said first demodulating means; summing means connected to receive at a first input, said output signal from said second demodulating means and adapted to receive at a second input, a first polar coordinate signal to be resolved, said summing means being adapted to provide an output signal indicative of a summation of said first and second input signals; second multivibrator means connected to receive as an input signal, said output signal from said summing means and adapted to provide as an output signal, a third reference signal indicative in frequency of the sense and amplitude of said input signal; means connecting said output of said second multivibrator means to said second input of said second demodulating means; modulator means connected to receive as a first input signal said third reference output signal from said second multivibrator means and adapted to receive as a second input signal a second polar coordinate signal to be resolved, said modulator means providing as an output signal a fourth reference signal which is amplitude modulated in accordance with characteristics of said second polar coordinate input signal; wave shaping means connected to receive as an input signal said fourth reference signal from said modulating means and adapted to provide as an output signal a fifth reference signal which is a sinusoidal signal indicative in phase and amplitude of said fourth reference input signal; third demodulating means connected to receive as a first input signal said reference signal from said first multivibrator means and as a second input signal said fifth reference signal from said wave shaping means, said third demodulating means being adapted to provide a signal as an output, indicative of said second polar coordinate signal times the sine of said first polar coordinate signal by demodulating the difference between said second and fifth reference signals; and fourth demodulating means connected to receive as a first input signal said first reference signal from said input of said first demodulating means and as a second input signal said fifth reference signal from said waveshaping means, said fourth demodulating means being adapted to provide a signal as an output, indicative of said second polar coordinate signal times the cosine of said first polar coordinate signal by demodulating the difference between said first and fifth reference signals.

10. In a resolving system: first demodulating means adapted to receive as a first input signal, a first reference signal and to receive a second reference signal as a second input signal, said first demodulating means being adapted to provide an output signal indicative in sense and magnitude of a phase difference between said first and second reference signals; summing means connected to receive at a first input, said output signal from said first demodulating means and adapted to receive at a second input a first polar coordinate signal to be resolved, said summing means being adapted to provide an output signal indicative of a summation of said first and second input signals; multivibrator means connected to receive as an input signal said output signal from said summing means and adapted to provide as an output signal, a second reference signal indicative in frequency of the sense and amplitude of said input signal; means connecting said output of said multivibrator means to said second input of said first demodulating means; modulator means connected to receive as a first input signal said second reference output signal from said multivibrator means and adapted to receive as a second input signal a second polar coordinate signal to be resolved, said modulator means providing as an output signal a third reference signal which is amplitude modulated in accordance with characteristics of said second polar coordinate input signal; second demodulating means connected to receive as a first input signal said first reference signal from said input of said first demodulator means and as a second input signal said third reference signal from said modulator means, said second demodulating means being adapted to provide a signal as an output, indicative of said second polar coordinate signal times the sine of said first polar coordinate signal by demodulating the difference between said first and third reference signals; and third demodulating means connected to receive as a first input signal a fourth reference signal approximately ninety degrees out of phase with respect to said first reference signal and as a second input signal said third reference signal from said waveshaping means, said third demodulating means being adapted to provide a signal as an output indicative of said second polar coordinate signal times the cosine of said first polar coordinate signal by demodulating the difference between said third and fourth reference signals.

11. In a resolving system: first demodulating means adapted to receive as a first input signal a first reference signal and to receive a second reference signal as a second input signal, said first demodulating means being adapted to provide an output signal indicative in sense and magnitude of a phase difference between said first and second reference signals; summing means connected to receive at a first input, said output signal from said first demodulating means and adapted to receive at a second input, a first polar coordinate signal to be resolved, said summing means being adapted to provide an output signal indicative of a summation of said first and second input signals; first multivibrator means connected to receive as an input signal, said output signal from said summing means and adapted to provide as an output signal, a second reference signal indicative in frequency of the sense and amplitude of said input signal; means connecting said output of said first multivibrator means to said second input of said first demodulating means; modulator means connected to receive as a first input signal said first reference signal from said first input of said first demodulating means and adapted to receive as a second input signal a second polar coordinate signal to be resolved, said modulator means providing as an output signal a signal which is amplitude modulated in accordance with characteristics of said second polar coordinate input signal; wave shaping means connected to receive as an input signal said output signal from said modulating means and adapted to provide as an output signal a third reference signal which is a sinusoidal signal, indicative in phase and amplitude of said input signal; second demodulating means connected to receive as a first input signal said second reference signal from said first multivibrator means and as a second input signal said third reference signal from said wave shaping means, said second demodulating means being adapted to provide a signal as an output indicative of said second polar coordinate signal times the sine of said first polar coordinate signal by demodulating the difference between said second and third reference signals; third demodulating means connected to receive as a first input said second reference signal from said first multivibrator means and adapted to receive as a second input, a fourth reference signal, said third demodulating means being adapted to provide an output signal indicative of a phase difference between said second and fourth input reference signals; second multivibrator means connected to receive as an input signal said output signal from said third demodulating means and adapted to provide as an output signal, a fourth reference signal indicative in frequency of the sense and amplitude of said input signal; means connecting said output of said second multivibrator means to said second input of said third demodulating means; and fourth demodulating means connected to receive as a first input signal said fourth reference signal from said output of said second multivibrator means and as a second input signal said third reference signal from said wave shaping means, said fourth demodulating means being adapted to provide a signal as an output, indicative of said second polar coordinate signal times the cosine of said first polar coordinate signal by demodulating the difference between said third and fourth reference signals.

12. In a resolving system: first demodulating means adapted to receive as a first input signal a first reference signal and to receive a second reference signal as a second input signal, said first demodulating means being adapted to provide an output signal indicative in sense and magnitude of a phase difference between said first and second reference signals; summing means connected to receive at a first input, said output signal from said first demodulating means and adapted to receive at a second input, a first polar coordinate signal to be resolved, said summing means being adapted to provide an output signal indicative of a summation of said first and second input signals; first multivibrator means connected to receive as an input signal, said output signal from said summing means and adapted to provide as an output signal, a second reference signal indicative in frequency of the sense and amplitude of said input signal; means connecting said output of said first multivibrator means to said second input of said first demodulating means; modulator means connected to receive as a first input signal said first reference signal from said first input of said first demodulating means and adapted to receive as a second input signal a second polar coordinate signal to be resolved, said modulator means providing as an output signal a signal which is amplitude modulated in accordance with characteristics of said second polar coordinate input signal; wave shaping means connected to receive as an input signal said output signal from said modulating means and adapted to provide as an output signal a third reference signal which is a sinusoidal signal, indicative in phase and amplitude of said input signal; second demodulating means connected to receive as a first input signal said second reference signal from said first multivibrator means and as a second input signal said third reference signal from said wave shaping means, said second demodulating means being adapted to provide a signal as an output indicative of said second polar coordinate signal times the sine of said first polar coordinate signal by demodulating the difference between said second and third reference signals; means for supplying a fourth reference signal which is approximately ninety degrees out of phase with said second reference signal at all times and of the same amplitude; and third demodulating means connected to receive as a first input signal said fourth reference signal from said means and as a second input signal said third reference signal from said wave shaping means, said third demodulating means being adapted to provide a signal as an output, indicative of said second polar coordinate signal times the cosine of said first polar coordinate signal by demodulating the difference between said third and fourth reference signals.

References Cited in the file of this patent

G. L. Keister: "Transistor-Magnetic Analog Multiplier," Electronics, October 1956, pp. 160-163.